US006993251B1

(12) United States Patent
Phillips et al.

(10) Patent No.: US 6,993,251 B1
(45) Date of Patent: Jan. 31, 2006

(54) METHOD AND APPARATUS FOR CONCEALING DISK SOFT ERRORS IN RECORDED DIGITAL TELEVISION SIGNALS

(75) Inventors: Larry Phillips, Cherry Hill, NJ (US); Ric Conover, Hatboro, PA (US); Kurt Dustin, Pennington, NJ (US)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/539,815

(22) Filed: Mar. 31, 2000

(51) Int. Cl.
*H04N 5/781* (2006.01)
(52) U.S. Cl. ..................................... 386/125; 386/126
(58) Field of Classification Search .................. 386/46, 386/96, 98, 95, 104, 111, 112, 125, 126, 137; 369/30.36
See application file for complete search history.

(56) References Cited

U.S. PATENT DOCUMENTS

| | | | |
|---|---|---|---|
| 5,053,892 A | 10/1991 | Supino, Jr. et al. | |
| 5,189,566 A | 2/1993 | Christensen et al. | |
| 5,323,367 A * | 6/1994 | Tamura et al. | 369/30.36 |
| 5,502,573 A * | 3/1996 | Fujinami | 386/65 |
| 5,530,705 A | 6/1996 | Malone, Sr. | |
| 5,701,383 A | 12/1997 | Russo et al. | |
| 5,706,388 A | 1/1998 | Isaka | |
| 5,745,645 A * | 4/1998 | Nakamura et al. | 386/131 |
| 5,761,180 A | 6/1998 | Murabayashi et al. | |
| 5,930,450 A * | 7/1999 | Fujita | 386/95 |
| 5,999,691 A | 12/1999 | Takagi et al. | |
| 6,396,874 B1 * | 5/2002 | Kato | 375/240.16 |
| 6,718,119 B1 * | 4/2004 | Fujinami | 386/52 |

OTHER PUBLICATIONS

TiVo Personal TV Receiver, digital recording Without Tape, http://starlink-dss.com/tivo.html.
Will Replay TV Make Me More Popular? And Other Frequently Asked Questions, http://replaytv.com/overview/faqs.htm.
What is TiVo, http://www.tivo.com/what/how2.html.

* cited by examiner

*Primary Examiner*—Huy Nguyen
(74) *Attorney, Agent, or Firm*—RatnerPrestia

(57) ABSTRACT

A video data storage system holds MPEG compressed video data on a hard disk drive. A transport decoder receives a bit-stream including the compressed audio and video data formatted as transport packets and that reformats the compressed audio and video data into respective program elementary stream (PES) packets. The system stores the audio and video PES packets onto a disk. The system also includes separate audio and video buffer memories that hold the audio and video PES packets when they are read from the disk drive. An MPEG decoder separately accesses the audio and video data from the respective audio and video buffer memories. The audio buffer memory has an amount of memory sufficient to provide the MPEG decoder with audio data representing ten seconds of decoded audio signal. In one embodiment, when a soft error occurs, the MPEG decoder continues to read and decode data from the audio buffer, but stops reading and decoding data from the video buffer. During this time, the MPEG decoder continually displays a current image. After the disk has recovered from the soft error, the MPEG decoder continues to retrieve and decode video data from the video buffer memory and drops P or B frames to resynchronize the video data stream to the audio data stream.

6 Claims, 4 Drawing Sheets

METHOD AND APPARATUS FOR CONCEALING DISK SOFT ERRORS IN RECORDED DIGITAL TELEVISION SIGNALS

BACKGROUND OF THE INVENTION

The present invention concerns a system and method for recording audio and video information onto a hard disk drive and in particular to apparatus and a method for concealing soft errors when the audio and video data are read from the hard disk.

Recently, several video recording products have been introduced in the consumer market that allow television viewers to record their favorite programs to a hard disk drive instead of a video tape. These systems include the ReplayTV system available from Replay Networks and the TiVo Personal TV Service available from TiVo, Inc. These systems allow viewers to record between 14 and 30 hours of television programs that may then be viewed in any order. In addition, these players allow a live video broadcast to be recorded and paused such that a viewer may begin watching the program in real time and, after the pause, continue watching the recorded program. One such system is described in U.S. Pat. No. 5,999,691 to Takagi et al. entitled TELEVISION RECEIVER, RECORDING AND REPRODUCTION DEVICE, DATA RECORDING METHOD AND DATA REPRODUCING METHOD.

These systems operate by receiving analog or compressed digital television signals, compressing the analog signals using, for example, the encoding standards specified by the Moving Picture Experts Group (MPEG), and storing the compressed digital video and audio data onto a hard disk drive.

The disk drives used in these systems tend to be more expensive than comparable disk drives used, for example, in conventional personal computer systems. This is because the digital television recorders do not tolerate disk soft errors. Disk soft errors are errors that occur the first time data is read but do not occur when the same data is read again. These errors can occur, for example, due to misalignment between the disk head and the data track, or due to a temporary change in the magnetic properties of the disk head in the disk drive.

In a conventional computer disk drive, these errors are handled in the disk controller. When the controller reads a data segment, it determines whether the data have been read correctly by applying a checksum, cyclic redundancy check (CRC) or error correction code to the retrieved data. If this process indicates errors in the data, the controller retries the read operation. That is to say, it causes the disk drive to reread the track from which the erroneous segment was taken. In many cases, the second or third time the data is read from the disk, no error occurs. In these instances, the original error is classified as a soft error. If the retry operation can not recover the data, the error is classified as a hard error.

In some disk drive systems, the interval between reading the data the first time and the second time includes an intermediate write step in which the disk head is positioned on an unused portion of the disk or on a portion of the disk containing known data and is activated to write a small amount of data. This operation counteracts a temporary change in the magnetic properties of the disk head which may occur during prolonged data read operations. Most disk drives include unused portions that serve as spare tracks. These tracks are substituted for bad tracks in the main part of the disk. Because the data written during the write operation performed after a soft error is not important, the operation may be performed on one of the spare segments or even on a known bad segment of the disk. Alternatively, all disk drives include track headers that contain known information. Rather than writing random information to a spare or bad track, the disk controller may re-write known data in a track header.

While the disk drive can usually fully recover data from a soft error, it is by definition unable to recover data from a hard error. Typically, disk drives handle errors of this type by marking the segment in which the hard error occurs as a bad disk segment. The segment is then not used for subsequent read and write operations and any data in that segment is lost.

The problem that video disk recorders have with disk soft errors relates to the disk latency between the first and second read operations. If, for example, the disk is operating at 3600 revolutions per minute (RPM), the rotational latency between the first disk read operation and the retry read operation consumes approximately 16 milliseconds. This is the same amount of time as is used to display one video field of an interlace scan video signal, or one video frame of a progressive scan video signal. Thus, if the disk drive performs one or more retry operations when a soft error occurs, the input data stream is effectively delayed by at least one field or frame interval. Data that is compressed according to the MPEG standard does not tolerate even slight delays in the input data stream. In the MPEG standard, each image has defined times at which it is to be decoded and displayed. If a soft error delays the recovery of data from the disk, the decoder may not be able to process the data in time to meet these timing requirements.

Conventional disk based video recording systems solve this problem by ignoring disk soft errors. When a disk error occurs whether it is a hard error or a soft error, the corrupted data is passed on to the decoder and the system does not retry the disk read operation. When the decoder recognizes that the data is corrupted, it may at least partially conceal the error using conventional drop out compensation circuits that, for example, repeat a previous field or frame to compensate for errors in the video stream and mute the audio signal to compensate for errors in the audio data stream. If the decoder does not recognize the data as being corrupted, it attempts to decode it, possibly causing additional audio and video distortion.

In addition, to compensate for the lack of disk soft error compensation, the disk drives used in conventional television recording systems may be designed to minimize soft errors. This undesirably adds to the cost of the disk based video system. The frequency of soft errors in a disk drive tends to increase as the drive ages. Consequently, the quality of the reproduced television programs decreases.

SUMMARY OF THE INVENTION

The present invention is embodied in a disk based video recording system that uses conventional disk drives having soft error retry capabilities. The system minimizes disruption caused by the soft error retry by formatting and recording the digitally compressed video and audio data in program elementary stream (PES) packet format. When these packets are recovered, the audio and video data are stored in separate buffers. The audio buffer is sized to accommodate soft error retries without disruption. Soft errors occurring in the video data stream are handled using the conventional video dropout compensation methods.

According to one aspect of the invention, the system continues to process the video data stream recovered after a soft error until a next image is to be decoded that is not used as a reference for another image. The decoder then flushes the data for this image from the buffer and begins decoding the next image in the sequence. This operation allows the system to recover from any delay in the video signal that occurred during the retry operation and to resynchronize the video data stream with the audio data stream.

DETAILED DESCRIPTION

Figure 1:
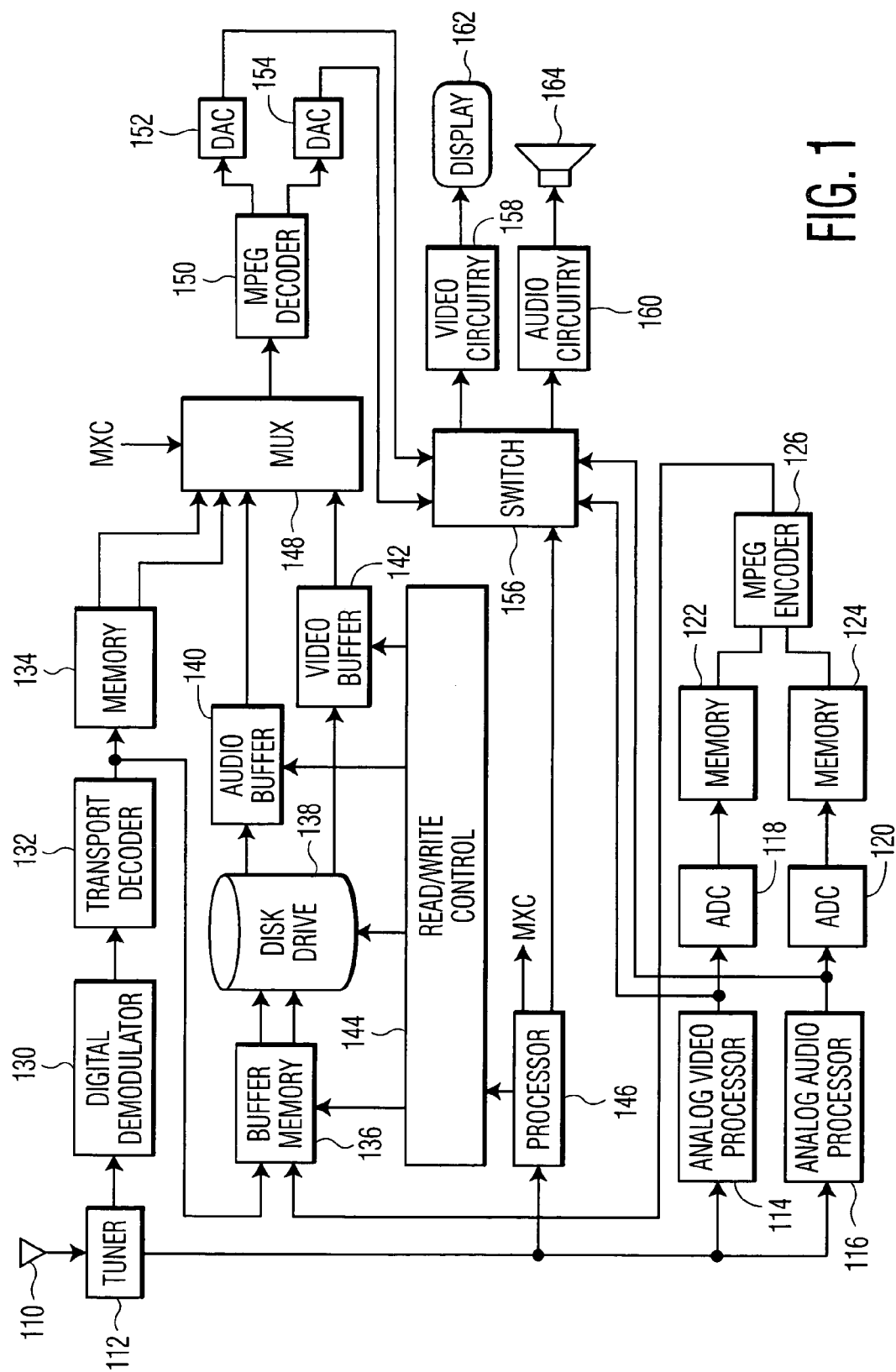
FIG. 1 is a block diagram of a disk based television recording and display system that includes an embodiment of the subject invention.

For the sake of clarity, the invention is described in terms of only a frame-based MPEG video decoding system. It is contemplated, however, that it may be used with a field based system as well.

The MPEG standard defines a complex encoding process by which temporal and spatial redundancy in video and audio signals is removed to achieve high compression ratios. A key element in the video compression techniques is the removal of temporal redundancy by motion compensated encoding. MPEG signals are encoded in a mixture of three different frame formats, I-frames, P-frames and B-frames. An I-frame is encoded using only the data in the frame itself while P and B frames are predictively encoded. P-frames are predictively encoded based on data in a previously encoded I-frame or P-frame and B-frames are bidirectionally encoded using data from previously encoded I-frames and P-frames or from two previously received P-frames. Thus, an I-frame may be recovered using only the data in the recorded I-frame while P and B frames require data from previously decoded frames in order to be fully decoded. B-frames are not used to encode any other frames. In systems that use only I and P frames, some of the P-frames are not used to decode any other frames.

When video signals are encoded according to the MPEG standard, I-frames occur at periodic intervals in order to minimize the effect of errors in any I-frame. Because subsequent P and B frames depend upon data in the I-frame, an error in the I-frame propagates through to the subsequent P and B frames.

When television signals are compressed, the video and audio information is separated and separately encoded. The encoded video I, B and P frames are encoded according to the MPEG standard and then formatted into variable-length video program elementary stream (PES) packets. Similarly, the audio information is encoded and formatted into variable-length audio PES packets. Typically, one PES packet includes one access unit, either an encoded image (i.e. field or frame) or an encoded audio frame. The video and audio PES packets are then formatted into transport packets each having a header and a fixed length data field. In most existing digital video recording systems, it is these transport packets that are recorded on the recorded medium. The television signal is recorded as a single stream with mixed audio, video and data transport packets.

Thus, when a soft error occurs and is ignored, both audio and video information are lost, if the lost video information amounts to an entire frame, it may be handled using conventional video dropout compensation techniques, for example, repeating a previously stored frame during the time the missing frame would have been displayed. These techniques do not disrupt the flow of the video, especially if only one or two frames are repeated. Thus, the distortion caused by the video dropout compensation techniques may be easily ignored by a viewer. The dropout compensation schemes used to recover from audio errors, however, may be extremely disruptive. If, for example, during a loud portion of the audio program a dropout occurs, the existing dropout compensation techniques mute the audio during this interval causing a rapid drop in the audio level. Errors of this type are difficult to ignore.

The present invention mitigates the disruption caused by soft errors and by the retry of soft errors by separately recording the audio and video data in PES packet format. The PES packets are stored in separate buffers when they are recovered from the disk. The amount of time represented by the encoded data in the audio buffer is relatively large compared to that represented by the encoded data in the video buffer. According to the present invention it is sized to accommodate multiple soft errors so that the audio signal may be recovered without disruption. The video buffer in one exemplary embodiment of the invention, is sized to handle a relatively small number of retry operations that may occur in response to a single soft error. If the retry operations delay the video information sufficiently so that the video and audio information are no longer synchronized, one embodiment of the invention brings the video stream back into alignment with the audio stream by dropping a subsequent P or B frame. Thus, a viewer using a system according to the present invention perceives a substantially uninterrupted audio signal and a video signal having occasional repeated frames. The perceived disruption of the video signal is less than for conventional disk based video recording system while the system according to the present invention also uses a less expensive disk drive.

FIG. 1 is a block diagram of a television receiver that may include an embodiment of the present invention. The receiver includes an antenna 110 which receives broadcast analog and digital video signals or digital satellite television signals and applies these signals to a tuner 112. When the tuner 112 receives an analog signal it provides separate baseband analog video signals and analog audio signals to video signal processor 114 and audio signal processor 116, respectively. These processors convert the received signals into video and audio signals suitable to be reproduced by the television receiver. These signals are applied to first video and audio inputs of a switch 156, described below.

The analog video and audio signals provided by the processors 114 and 116 are also digitized in analog to digital converters (ADCs) 118 and 120. The ADCs 118 and 120 store the video and audio signals into buffer memories 122 and 124 that are coupled to an MPEG encoder 126. The MPEG encoder 126 compresses the video and audio signals and formats the compressed signals into PES packets. The resulting PES packets are written into a buffer memory 136. Memory 136, under control of the read write control circuitry 144 stores the PES packets on to a disk drive 138.

When the turner 112 receives a digital television signal, it applies the signal to a digital demodulator 130 that recovers a stream of transport packets from the digital television signal. These packets are applied to a transport decoder 132 that, in the exemplary embodiment of the invention, reformats the transport packets into PES packets. The PES packets are applied to a memory 134 and to the buffer memory 136 to be written on to the disk drive 138. The video and audio PES packets are recovered from the disk drive 138 responsive to the read/write control circuitry 144 under control of the processor 146. The recovered audio PES packets are stored into a buffer memory 140 while recovered video packets are stored into a buffer memory 142. The audio and video PES packets from the buffer memories 140 and 142 are applied to two data input ports of a multiplexer 148. The other two data input ports of the multiplexer 148 are coupled to receive respective audio and video PES packets that were recovered by the to transport decoder 132 from the real-time broadcast and stored into the buffer memory 134.

The read/write control circuitry 144 monitors the fullness of the buffers 140 and 142 to control the reading of data from the disk drive 138. Each buffer has a level indicator and two stop points, a high water mark and a low water mark. When the amount of data in the buffer is greater than or equal to the high water mark, the circuitry 144 stops reading data for that buffer from the disk drive 138. When the amount of data in one of the buffers is less than the low water mark, the controller 144 prevents the MPEG decoder from reading data from the buffer. The disk transfer speeds are sufficient so that a buffer may be filled at a rate that is much greater than the rate at which the MPEG decoder 150 empties data from the buffers.

Responsive to a control signal MXC provided by processor 146, the multiplexer 148 applies either the PES packets from memory 134 or the PES packets from memories 140 and 142 to an MPEG decoder 150. The MPEG decoder 150 provides digital video and audio signals to respective digital to analog converters (DACs) 152 and 154.

The analog audio and video signals provided by DACs 152 and 154 are applied to two data input ports of a switch 156. As described above, the other two data input ports of switch 156 are coupled to receive the real-time decoded analog video and audio signals provided by the processors 114 and 116. Switch 156 is responsive to a signal provided by processor 146 to apply either the decoded MPEG audio and video signals or the audio and video signals provided by the processors 116 and 114 to respective audio and video reproduction circuitry 160 and 158. Circuitry 160 may include, for example, audio amplification, equalization and tone control circuitry. The output audio signals provided by the circuitry 160 are reproduced through a speaker system 164. The video circuitry 158 includes, for example, color and tint processing circuitry as well as brightness and black level circuitry. Video signals provided by the circuitry 158 produce images for display on a display device 162.

In operation, the exemplary embodiment of the invention stores PES packets on the disk drive 138 as they are received in the buffer memory 136. These packets are then read from the disk drive into the audio buffer 140 and video buffer 142. In the exemplary embodiment of the invention, the audio buffer is a 256 kilobyte buffer which holds, for example, 10 seconds of compressed audio data. The exemplary video buffer 142 is a 3 megabyte memory which holds, for example, three frames of compressed video data.

Because the disk drive is a conventional unit of the same type that is used in personal computer systems, when a soft error occurs, it retries the previous read operation. During this time, the MPEG decoder 150 is receiving information from the audio and video buffers 140 and 142, however, no information is being stored into the buffers from the disk drive 138 until the retry operation is successful.

In all of the embodiments of the invention, the audio buffer 140 is sufficiently large to be able to continue to provide audio information to the MPEG decoder 150 even when a soft error occurs. Thus, when a soft error occurs, the viewer will not experience and interruption in the audio portion of the television signal.

The MPEG decoder 150 synchronizes an internal clock signal to the input data stream. This clock signal determines when a video frame is sent to the video circuitry 158 to be displayed and when an accompanying audio signal is sent to the audio signal processing circuitry 160. Because the audio data stream is not interrupted in the subject invention, the MPEG decoder 150 may be modified to preferentially retrieve the timing information used to synchronize the clock signal from the audio PES packets or from the audio bit stream.

In a first embodiment of the invention, the processor 146 inhibits the video buffer 142 from providing data to the MPEG decoder 150 as soon as the soft error is detected. The processor 146 then signals the decoder 150 to repeat the frame that is currently being displayed until the disk drive 138 has recovered from the soft error. By stopping the decoding of video packets while continuing to decode audio packets, this embodiment of the invention, loses synchronization between the audio and video packets each time a soft error occurs. To resynchronize the video and audio portions of the program, the processor 146 controls the video buffer 142 via the read write control circuitry 144 to drop one or more subsequent B frames or P frames that are not used as a reference frame for any other frame. The loss of this data advances the video portion of the program relative to the audio program, re-synchronizing the video buffer with the audio buffer.

Typically, the disk drive is able to read data from the disk into the buffers 140 and 142 at a much greater rate than the rate at which the data is used by the MPEG decoder 150. Accordingly, after a soft disk error occurs, if the buffers are close to their low-water marks, the system quickly transfers data from the disk into the buffers to bring the buffers back to their high-water marks.

According to a second embodiment of the invention, the video buffer 142 includes a sufficient amount of memory to hold more than one image frame (e.g. three frames). When a soft error occurs, the retry operation recovers the missed data and stores it into the buffer 142. Because the buffer includes sufficient memory to continue to provide video information even during the soft error recovery, the video signal is not interrupted when the soft error occurs. If, however, the soft error continues after all of the available data in the buffer has been read, the video portion of the program may lose synchronization with the audio program. The buffers are then re-synchronized as described above.

In a third embodiment of the invention, the delay in providing data from the disk drive causes the video buffer 142 to underflow. When the underflow occurs, the MPEG decoder 150 activates its dropout compensation algorithms to display the current video image until valid data is once again available from the video buffer 142. If, for example, the underflow occurs when video buffer 142 is providing I-frame data to the MPEG decoder 150, the MPEG decoder 150 may display the current image for several frame intervals until the next I-frame is available to be decoded. The processor 146 resynchronizes the audio and video data streams by selectively dropping B and/or P frames, as described above.

Figure 2A:
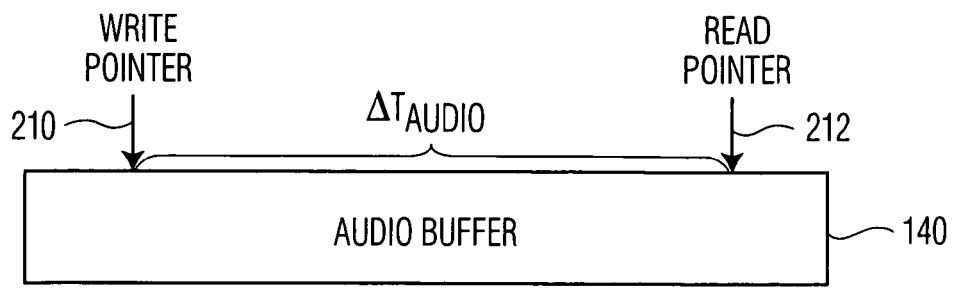
FIGS. 2a through 2f are data diagrams of the video and audio buffers shown in the television receiver of FIG. 1 which are useful for describing the operation of the present invention.
Figure 2B:
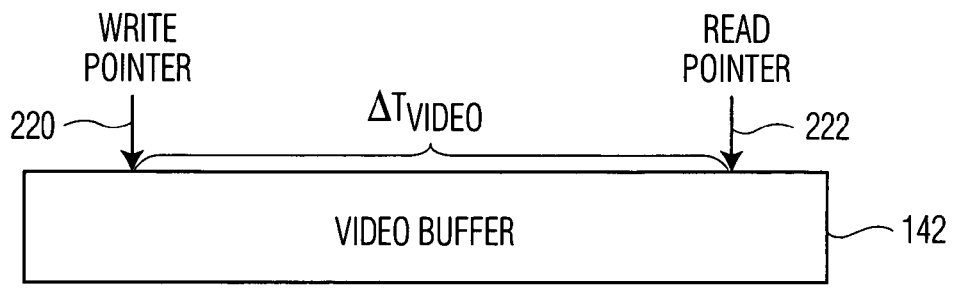

FIGS. 2a through 2f are video buffer diagrams that illustrate the operation of the exemplary embodiment of the invention when a soft error occurs. FIGS. 2a and 2b show the audio buffer 140 and video buffer 142 before the occurrence of the soft error. Although they are shown as linear buffers, in the exemplary embodiment of the invention, the buffers 140 and 142 are circular buffers having circulating read and write pointers. In FIGS. 2a through 2f, the buffer is filled from right to left. In FIG. 2a, for example, the write pointer 210 is ahead of the read pointer 212 by an amount of time $\Delta T_{AUDIO}$. The time $\Delta T_{AUDIO}$ represents an amount of time used to present decoded audio signals generated from the encoded data in the buffer. This is the amount of time that data may be read from the audio buffer without writing any more data into the audio buffer 140. As set forth above, in the exemplary embodiment of the invention, $\Delta T_{AUDIO}$ is approximately ten seconds. In the same way, the video buffer 142 includes a write pointer 220 and read pointer 222 separated by an amount of time $\Delta T_{VIDEO}$. In the exemplary embodiment of the invention, $\Delta T_{VIDEO}$ is approximately three frame intervals.

In the absence of hard disk errors, the amounts of time $\Delta T_{AUDIO}$ and $\Delta T_{VIDEO}$ will remain substantially constant, varying only due to the compression is efficiency of the MPEG encoded data.

Figure 2C:
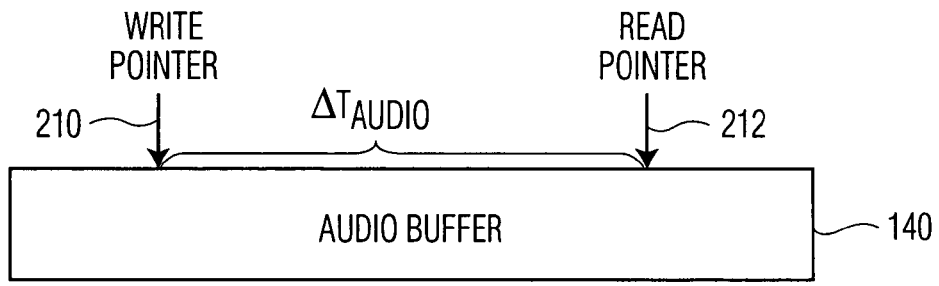
Figure 2D:
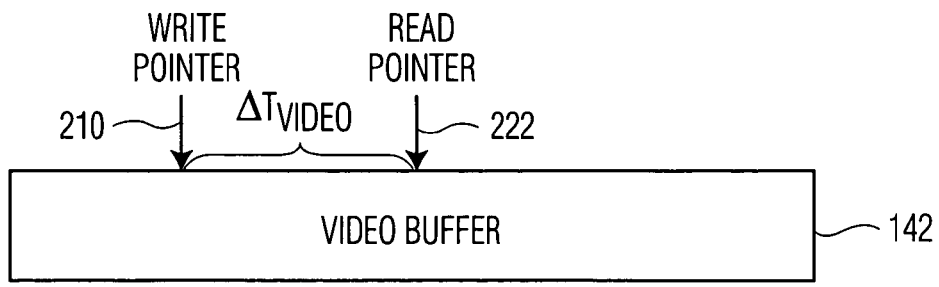
Figure 2E:
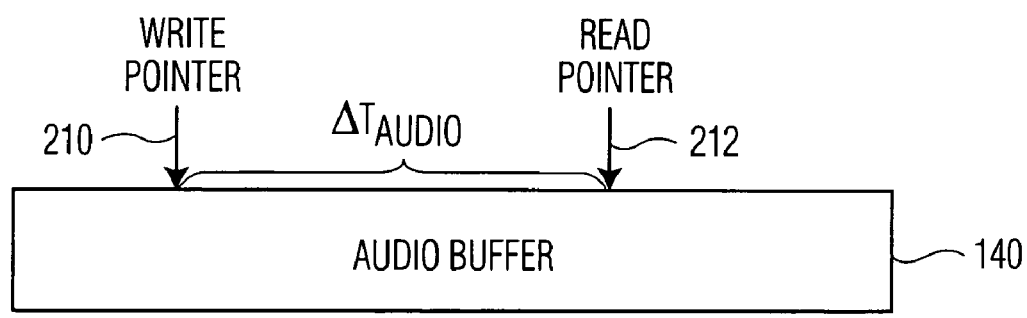
Figure 2F:
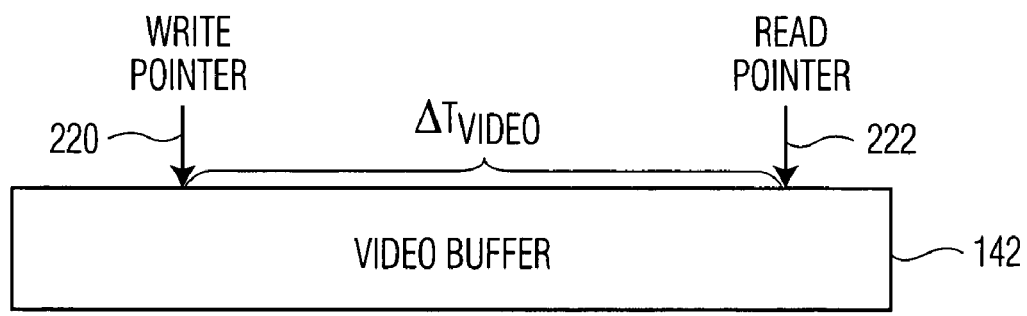

FIGS. 2c and 2d show the audio buffer 140 and video buffer 142 immediately after the retry for a soft error in the disk drive 138. During this retry interval, no new data is written into the audio buffer 140 or video buffer 142, however data has been read from these buffers by the MPEG decoder 150. Consequently the amount of time $\Delta T_{AUDIO}$ and $\Delta T_{VIDEO}$ is reduced in the buffer shown in FIGS. 2c and 2d relative to the amounts of time shown in FIGS. 2a and 2b. Although FIG. 2d shows a positive time $\Delta T_{VIDEO}$ in the video buffer 142 following the retry operation, it is contemplated that the retry operation may result in an underflow of the video buffer 142. An underflow occurs when the read pointer is less than the low-water mark defined for the buffer. Alternatively, an underflow may occur when the read pointer is at the same address as the write pointer causing $\Delta T_{VIDEO}$ to be zero. As set forth above, when an underflow occurs, the MPEG decoder 150 implements its dropout compensation algorithms causing the current frame to be continually displayed until the read/write controller 144 has stored sufficient data into the buffer 142 such that $\Delta T_{VIDEO}$ is greater than zero.

As another alternative, when a soft error occurs, the decoder 150 may continue to display data until it reaches the end of the current frame and then repeat the current frame until the retry operation is successful. If this method is used, the video information loses synchronization with the audio information because video information is being repeated while audio information is being played uninterrupted.

Figure 3:
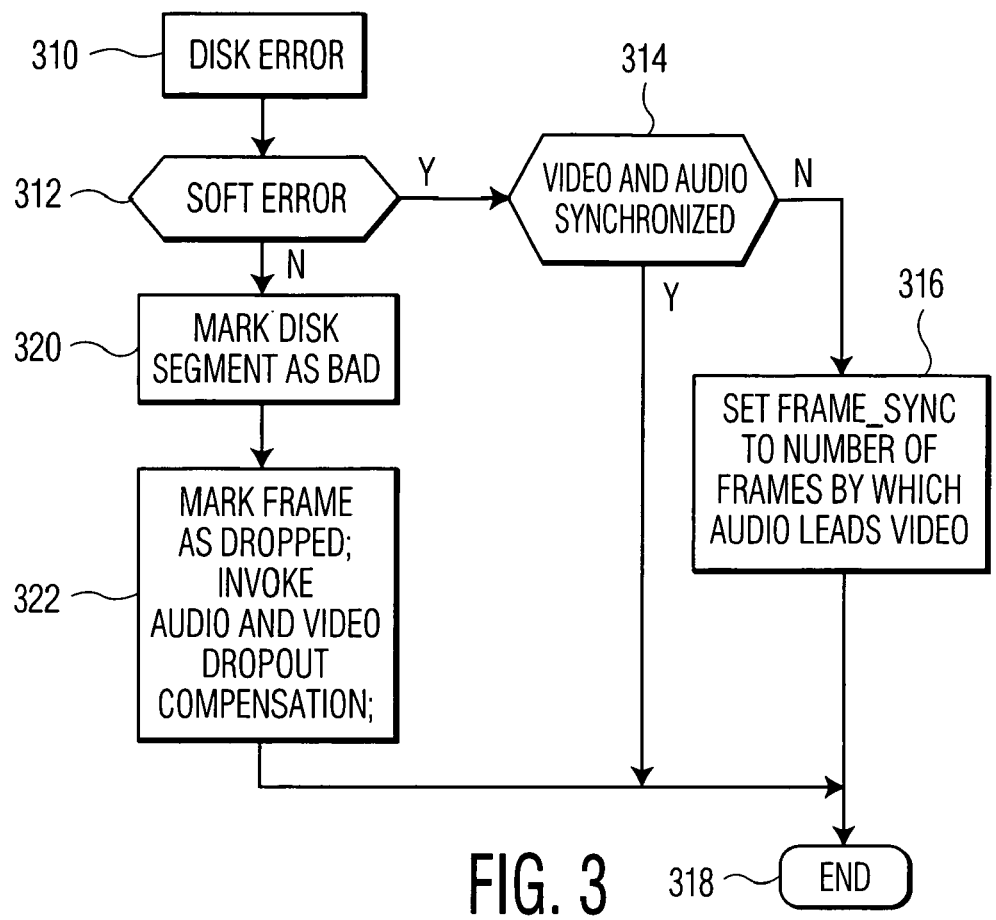
FIG. 3 is a flow chart diagram which is useful for describing the operation of the disk recording system on the occurrence of a disk error.
Figure 4:
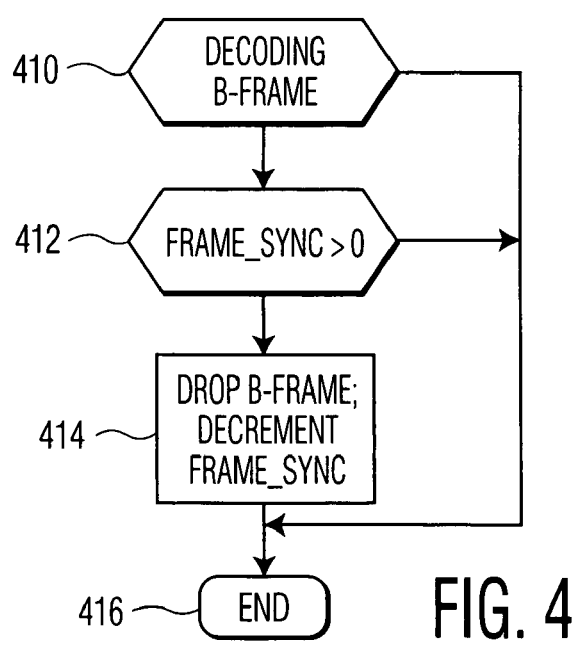
FIG. 4 is a flow chart diagram which is useful for describing how video errors are handled by the system shown in FIG. 1.

In accordance with this exemplary embodiment of the invention, after the soft error recovery is complete, video decoding continues using the data in the buffer 142 until the next B-frame occurs, if the encoded data stream includes B-frames, or until the next P-frame occurs if the encoded data stream does not include B-frames. At the time of the next P or B frame, the MPEG decoder 150 flushes the data for the P or B frame from the buffer 142, and immediately begins decoding the next frame after the discarded frame. This step advances the video stream relative to the audio stream. This process is repeated with subsequent P or B frames until the video and audio PES packets are re-synchronized FIGS. 3 and 4 are flow-chart diagrams that show the operation of the system in FIG. 1 on the occurrence of a disk error. The process shown in FIG. 3 is, for example, an interrupt which occurs in the processor 146 responsive to a disk error signaled by the disk drive 138. The process shown in FIG. 4, on the other hand, is a portion of the steady state process governing the MPEG decoder 150.

In FIG. 3, when a disk error occurs at step 310, the exemplary interrupt process, at step 312 determines whether the error is a soft error or a hard error. If the error was a hard error, that is to say the erroneous data could not be recovered, at step 320, the processor causes the disk drive 138 to mark the erroneous segment as bad and at step 322 marks the data in the buffer memories 140 and 142 as being from a dropped frame. This indication in the memories causes the MPEG decoder to invoke the audio and video dropout compensation algorithms when the data is fetched from the audio and video buffers. If, however, at step 312, the disk error at step 310 was a soft error, the process branches from step 312 to step 314 which determines if the video data stream is still synchronized to the audio stream. This step may, for example, receive a signal from the decoder 150 indicating that the video dropout compensation operations were invoked. Alternately, the processor 146 may read the decoding time stamps from the packet headers of respective audio and video PES packets that are being provided from the buffer memories 140 and 142 to the MPEG decoder 150. If there is an average fixed offset between the times over several packet transfers, then the audio and video data streams are not synchronized. If, at step 314, the two data streams are still synchronized then the video soft error was handled by data in the buffer and the interrupt ends at step 318.

If, however, at step 314, the video data stream is no longer synchronized to the audio stream then control is transferred to step 316 which sets a variable FRAME_SYNC to a value indicating a number of image frame intervals by which the video data stream lags the audio data stream. After step 316 and step 322 the process in FIG. 3 ends at step 318.

Because the audio buffer 140 has a sufficient amount of memory to recover from a from a disk soft error retry, no special processing is needed in the audio section of the MPEG decoding algorithm. FIG. 4 shows a modification of the video-decoding algorithm that is used with embodiment of the invention. In this embodiment of the invention, the encoded video signal includes I-frames, P-frames and B-frames. In this exemplary embodiment of the invention, when, at step 410, the MPEG decoder 150 is decoding a B-frame, it checks at step 412 if the variable FRAME_SYNC is greater than zero, if so, the decoder drops the B-frame and immediately begins decoding the next frame following the B-frame. Also at step 414, the variable FRAME_SYNC is decremented. If at step 410 a B-frame is not being decoded or if at step 412 the variable FRAME_SYNC is less than or equal to zero or after step 414, the modified process ends at step 416.

As set forth above, if the encoded video stream does not include B-frames, the algorithm shown in FIG. 4 may use P-frames instead of B-frames. In this instance, a P-frame should only be dropped if it is not used to decode any other P-frame.

While the invention has been described in terms of an exemplary embodiment it is contemplated that it may be practiced as described above within the scope of the attached claims.

What is claimed:

1. A method for storing video and audio data which have been compressed according to a standard specific by the Moving Pictures Experts Group (MPEG), the method comprising the steps of:
    monitoring the disk for soft errors;
    formatting the video and audio data into respective program elementary stream (PES) packets;
    recording the video and audio PES packets on a disk wherein the video PES packets are recorded separately from the audio PES packets;
    retrieving the video and audio PES packets from the disk;
    storing the retrieved audio and video PES packets into respective video and audio buffers, wherein the audio PES packets stored in the audio buffer represent a sufficient amount of audio data to be decoded during an interval in which no audio data is being stored into the audio buffer due to a first number of retries caused by at least one soft error on disk and the video PES packets stored in the video buffer represent a sufficient amount of video data to be decoded during an interval in which no video data is being stored into the video buffer due to a second number of retries caused by at least one soft error on the disk; wherein the first number of retries is greater than the second number of retries; and
    providing the decoded audio and video PES packets from the respective audio and video buffers to an MPEG decoder;
    when a soft error occurs, causing the MPEG decoder to repeatedly display a current frame; and
    after the occurrence of the soft error, performing the steps of:
        determining if the audio and video PES packets being provided to the MPEG decoder are synchronized in time;
        if the packets are not synchronized, monitoring the data stored into the buffer for encoded images that are not used to decode any other image and discarding video PES packets corresponding to the encoded images that are not used to decode any other image until the audio and video PES packets are synchronized in time.

2. A method according to claim 1, wherein the MPEG decoder includes an internal clock signal and the method further includes the step of synchronizing the internal clock signal to the audio PES packets provided from the audio buffer.

3. Apparatus, for use with an MPEG decoder, for storing video and audio data which has been compressed according to a standard specified by the Moving Pictures Experts Group (MPEG), the apparatus comprising:
    a transport decoder that receives a bit-stream including the compressed audio and video date formatted as transport packets and that reformats the compressed audio and video data into respect program elementary stream (PES) packets;
    a disk drive onto which the audio and video PES packets are separately recorded, wherein the disk provides a signal indicating that a soft error has occurred;
    an audio buffer memory for retrieving and storing the audio PES packets from the disk, wherein the audio PES packets stored in the audio buffer memory represent a sufficient amount of audio information to provide the MPEG decoder with audio data during an interval in which no audio data is being stored into the audio buffer due to a first number of retries caused by at least one soft error on the disk; and
    a video buffer memory for retrieving and storing the video PES packets from the disk, wherein the video PES packets stored in the video buffer memory represent a sufficient amount of video information to provide the MPEG decoder with video data during an interval in which no video data is being stored into the video buffer due to a second number of retries caused by at least one soft error on the disk, wherein the second number of retries is less than the first number of retries;
    wherein, the MPEG decoder, responsive to the soft error signal from the disk, repeatedly displays a current frame; and
    the apparatus further comprises:
    a processor, coupled to the audio and video buffers for determining if the audio and video PES packets being provided to the MPEG decoder are synchronized in time, wherein, if the packets are not synchronized, the processor monitors the data stored into the buffer for encoded images that are not used to decode any other image and discards video PES packets corresponding to the images that are not used to decode any other image until the audio and video PES packets are synchronized in time.

4. Apparatus according to claim 3, wherein the audio buffer memory has an amount of memory sufficient to hold encoded audio data representing approximately ten seconds of audio output.

5. Apparatus according to claim 3 wherein:
    the video buffer includes a sufficient amount of memory to provide data to the MPEG decoder with video data for the amount of time in which no data is stored into the buffer due to the soft error on the disk; and
    the apparatus further comprises:
    a processor, coupled to the audio and video buffers for determining if the audio and video PES packets being provided to the MPEG decoder are synchronized in time, wherein, if the packets are not synchronized, the processor monitors the data stored into the buffer for encoded images that are not used to decode any other image and discards video PES packets corresponding to the encoded images that are not used to decode any other image until the audio and video PES packets are synchronized in time.

6. Apparatus according to claim 5, wherein the video buffer includes a sufficient amount of memory to hold encoded data representing three frames of video information.

* * * * *